United States Patent
Hall

[15] 3,675,584
[45] July 11, 1972

[54] TRANSPORTATION SYSTEM

[72] Inventor: Edwin F. Hall, Sharon, Mass.

[73] Assignee: Alden Self-Transit Systems Corporation, Bedford, Mass.

[22] Filed: June 1, 1970

[21] Appl. No.: 41,955

[52] U.S. Cl. .................................104/28, 104/27, 94/1 A
[51] Int. Cl. ...........................................B61b 1/02, E01f 1/00
[58] Field of Search........................104/26, 27, 28, 29, 30, 1, 104/88; 94/1 A

[56] References Cited

UNITED STATES PATENTS

| | | | |
|---|---|---|---|
| 1,118,052 | 11/1914 | Roberts | 104/28 |
| 3,363,584 | 1/1968 | Brush | 104/26 R |
| 3,431,866 | 3/1969 | Bouladon | 104/30 |
| 3,552,321 | 1/1971 | Priebe | 104/88 |

FOREIGN PATENTS OR APPLICATIONS

| | | | |
|---|---|---|---|
| 302,376 | 12/1928 | Great Britain | 94/1 A |

OTHER PUBLICATIONS

The American City, Sept. 1963, page 141, Electronics, Inc. Advertisement

Primary Examiner—Arthur L. La Point
Assistant Examiner—D. W. Keen
Attorney—Willis M. Ertman

[57] ABSTRACT

A station arrangement in a transportation system that has two parallel travel arteries and has four distinct service areas. A station access path extends from each travel artery and divides into two station service paths at a junction. Each station service path passes a corresponding station service area and then merges with a service path from the other access path to form an exit path which in turn merges with the corresponding travel artery.

2 Claims, 5 Drawing Figures

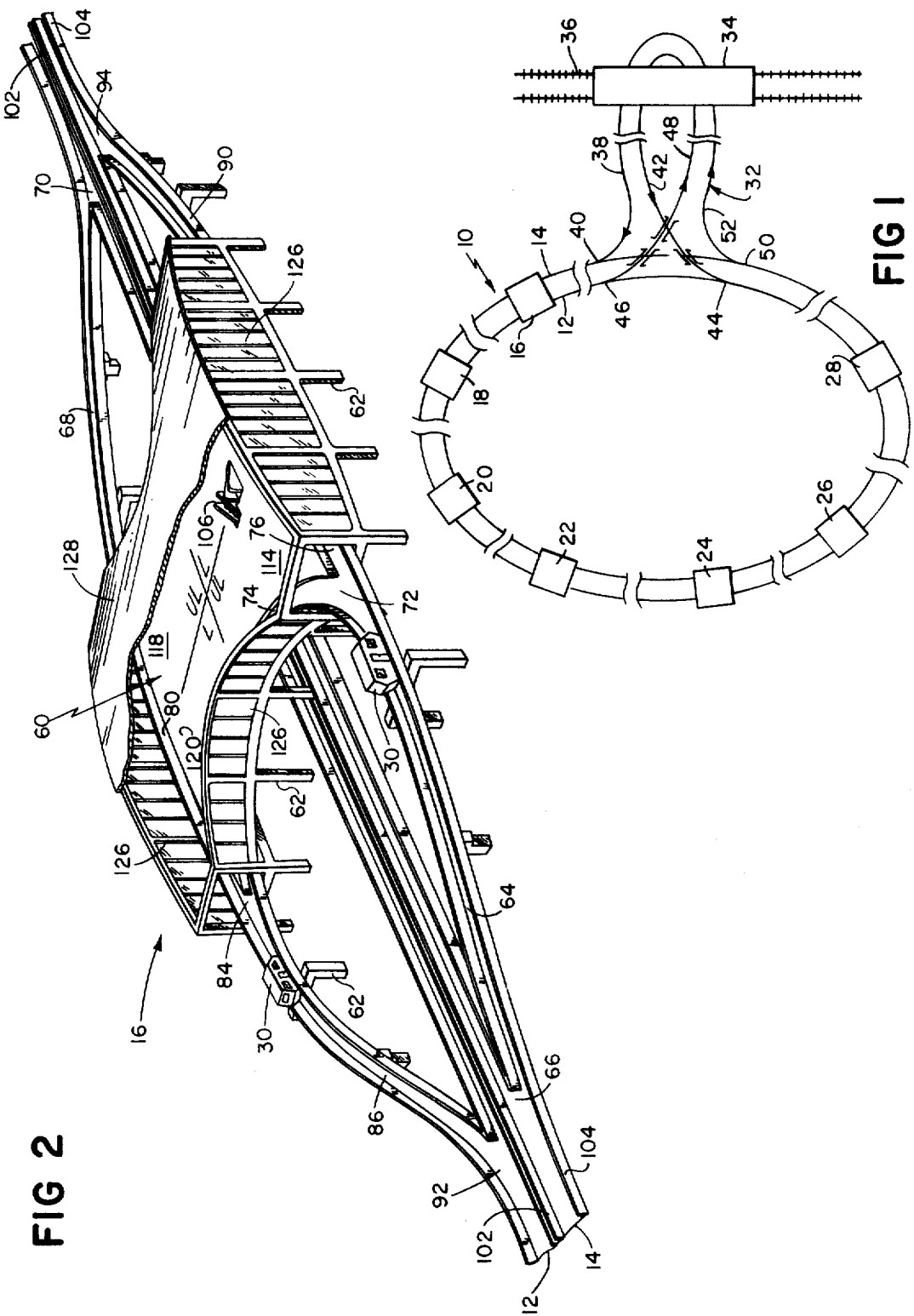

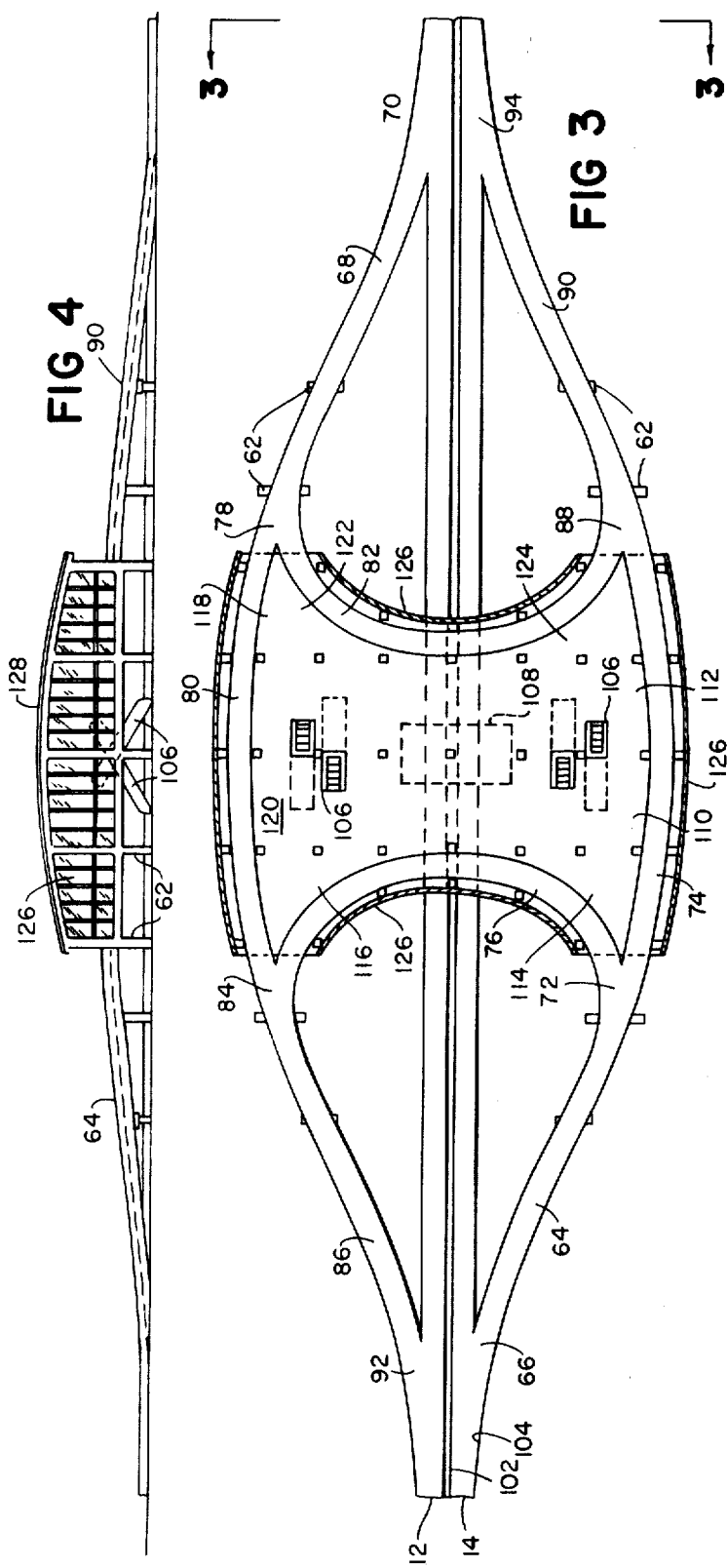
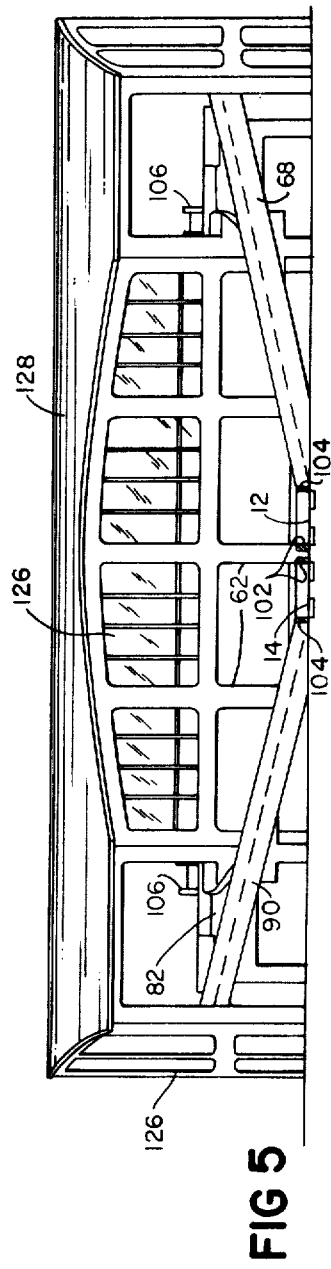

3,675,584

TRANSPORTATION SYSTEM

SUMMARY OF INVENTION

This invention relates to transportation systems and more particularly to station arrangements of transportation systems.

In a transportation system, convenient arrangements must be provided for interchange of passengers to and from the vehicles on the transportation system both loading and unloading. Frequently such systems must efficiently handle large number of passengers and the system must be flexible and convenient so that the passengers may reach their desired destination as promptly as possible. In particular arrangements, the transportation system is arranged to serve a series of stations and an endless loop form of artery system may be employed to serve such stations. In such arrangement a bi-directional travel artery system permits a passenger entering the system to select the travel artery that will enable him to reach his destination by the shortest route.

The capsule type of transportation system that employs small vehicles routed as individual units through the transportation system under computer control provides a flexibility to meet the varying transportation demands on the system. In such system, redundancy, load balancing capability, large passenger capacity, and bypass capability so that stops at intermediate stations are not required are desirable.

An object of the invention is to provide a novel and improved station arrangement for a transportation system.

Another object of the invention is to provide an economic station arrangement that provides econOmic use of material and space and provides convenient and flexible handling of passengers or material to be transported on the system.

In accordance with the invention there is provided a station arrangement for use in a transportation system that has a right of way and first and second parallel travel arteries disposed in that right of way. The station arrangement includes a station structure disposed at a vertically offset position above or below the travel arteries and right of way. The station structure has at least four distinct service areas. A station access path extends from each travel artery to the station structure and each access path divides into at least two station service paths at a junction adjacent the station structures. Each station service path extends past a corresponding station service area and then merges with another station service path from the other access path to form a station exit path. Each station exit path then merges with a corresponding travel artery.

The station arrangement in accordance with the invention provides a bypass capability so that any station can be readily bypassed and there is no dependence or need for waiting at a station for other vehicles. Further, the station arrangement provides load balancing flexibility and redundancy so that if one artery section is shut down vehicles can be shunted to another artery section to maintain service at a high degree of capacity.

In a particular embodiment the transportation system is arranged in an endless ring and serves a series of stations disposed about the ring. Access to the ring or loop from another system or source is provided easily. The station platform is an area from which direct access to all of the loading and unloading areas is obtained at the same level.

Other objects, features and advantages will be seen as the following description of a particular embodiment progresses, in conjunction with the drawings in which:

FIG. 1 is a diagram of a transportation system constructed in accordance with the invention;

FIG. 2 is a perspective view of a station arrangement employed in the transportation system shown in FIG. 1;

FIG. 3 is a plan view of the station shown in FIG. 2;

FIG. 4 is a side view of the station arrangement shown in FIG. 3 drawn to the same scale as FIG. 3; and FIG. 5 is an end view of the station arrangement drawn to a larger scale than FIG. 3.

DESCRIPTION OF PARTICULAR EMBODIMENT

The transportation system diagrammatically indicated in FIG. 1 includes a loop right of way 10 that has two travel arteries 12, 14 that serve a series of spaced stations 16, 18, 20, 22, 24, 26, 28. Capsule vehicles 30 circulate along the right of way. A spur right of way 32 provides connection to terminal 34 which may serve another form of transportation 36 or the spur 34 may connect with another loop system. Stations along a bi-directional track, spur or other arrangement may be similar to stations disposed along the loop. Vehicles leaving terminal 34 on artery 38 merge with loop artery 14 or junction 40 while vehicles leaving terminal 34 on artery 42 merge with loop artery 12 at junction 44. Similarly, vehicles on loop artery 12 may leave that artery at junction 46 for travel along spur artery 48 to terminal 34 and vehicles on loop artery 14 may leave that loop at junction 50 for travel to terminal 34 on spur artery 52.

Details of station 16 which is illustrative of the loop stations are shown in FIGS. 2–5. The station structure includes a platform area 60 that extends above the main travel arteries 12, 14 supported on piers 62. Access path 64 branches from travel artery 14 at junction 66 and access path 68 branches from travel artery 14 at junction 70. Station access path 64 at junction 72 branches into two station service paths 74, 76; and station access path 68, at junction 78 branches into two station service paths 80, 82 as shown in FIG. 3. Station service paths 76 and 80 merge at junction 84 to form a single station exit path 86 while service paths 74 and 82 merge at junction 88 to form a second station exit path 90. Station exit path 86 joins main artery 12 at junction 92 and station exit path 90 joins main artery 14 at junction 94. Additional station service paths parallel to paths 74, 76, 80 and 82 can be added if additional capacity is required.

The vehicles 30 that are employed in this transportation system, as indicated in FIG. 2, incorporate in-vehicle switching arrangements by which a desired path is selected by operation of vehicle switching apparatus carried by the vehicle. While other types of switching arrangements as well as various in-vehicle switching arrangements may be employed in a particular embodiment, a vehicle switching mechanism utilizes a biasable steering arrangement and two opposed sensor members, one of which is in engagement with a cooperating guide surface 102, 104 that extends along the vehicle path. The biased steering arrangement steers the vehicle toward a selected one of the guide surfaces 102, 104 and the guide follower in contact with that surface overcomes the biasing force so that the guide surface controls the steering of the vehicle as it moves along the vehicle path. Selection of one of two paths at a junction, as at junction 66, is determined by the biasing of the steering mechanism to cause a particular guide follower to engage the appropriate guide surface. Further details of this steering system may be had with reference to copending patent application Ser. No. 41,954, filed June 1, 1970, entitled TRANSPORTATION SYSTEM and assigned to the same assignee as this application. The vehicles 30 may be operated under computer control, and details of a suitable control system for such vehicles being disclosed in copending patent application Ser. No. 882,422, filed Dec. 5, 1969, entitled TRANSPORTATION SYSTEM and assigned to the same assignee as this application. It will be apparent that other control systems may be utilized in the practice of the invention.

The platform station area 60 may be a large open area having suitable access and egress means such as escalators 106. Convenience or service facilities may be located appropriately as at area 108. Each station service path may be used for loading, unloading and/or storage. In the illustrated embodiment, service path 74 has unloading area 110 and loading area 112; service path 76 has unloading area 114 and loading area 116; service path 80 has unloading area 118 and loading area 120; and service path 82 has unloading area 122 and loading area 124. The platform area and service paths are enclosed by appropriate structures 126 and those structures together with piers 62 support roof 128.

In operation, if the vehicle is to bypass station 16, a vehicle on travel artery 14 remains on that artery and passes under platform 60. If the vehicle has a destination at station 16 (either because it is carrying passengers for that station or there has been a request for a vehicle at that station, the switching mechanism biases the steering mechanism towards surface 104) the vehicle leaves the main travel artery at junction 66 and moves along the access path 64. If the vehicle is to continue along the main travel artery 14 after leaving station 16, the vehicle moves into service path 74 and stops at platform areas 110 and/or 112 to receive or discharge passengers or cargo. The vehicle then is launched in synchronism with traffic on artery 14 and moves out of station 16, enters the exit path 90 and passes through junction 94 to rejoin the main travel artery 14 for passage in the direction of the next station 18. Should there be a greater demand for vehicles on the other travel artery 12 either due to passengers desiring to travel on artery 12 or for other reasons, the vehicle enters service path 76 and moves through platform area 114. When the vehicle leaves it is appropriately launched in synchronism with the movement of vehicles on the main travel artery 12 for merging with service path 80 into exit ramp 86 and merging with artery 12 at junction 92. Thus the vehicle direction has been reversed and it moves along the main travel artery opposite to the artery from which it entered station 16.

This arrangement provides a compact station layout and platform area that requires minimum space with loading and unloading areas from two main travel lines in either direction adjacent one another so that instructions for use may be displayed clearly and distinctly. Similarly there is great flexibility of the location of entrance and egress facilities to and from the platform area and loading and unloading areas may be clearly demarcated.

In the system arrangement shown in FIG. 1, this station arrangement provides great flexibility for the allocation of cars to the various tations around the loop 10 in accordance with changing demand. Further, should either travel artery be blocked so that vehicles cannot move along it, this station arrangement enables vehicles to move on both arteries to the station immediately before the obstruction and then to be switched onto the opposite artery, thus providing substantial service even though one of the arteries is blocked. In an application of this system to serve several airline terminals at an airport for example, the vehicles are moved between stations in accordance with the demand requests at high density; all vehicles that carry passengers not desiring to stop at intermediate stations directly bypass the stations; the stations are compact and require a minimum amount of area; and the system maximizes the flexibility, redundancy and reliability of operation of the system.

While a particular embodiment has been shown and described, various modifications thereof will be apparent to those skilled in the art. It will be obvious that plural loading areas may be associated with one or more service paths, each loading area for example being associated with a corresponding exit path and the exit paths being connected to travel arteries other than travel arteries 10 and 12. Therefore, it is not intended that the invention be limited to the disclosed embodiment or to details thereof and departures may be made therefrom within the spirit and scope of the invention as defined in the claims.

What is claimed is:

1. A station arrangement for providing load balancing flexibility and redundancy in a transportation system having a right of way and first and second parallel travel arteries disposed in said right of way comprising, a station structure disposed at a vertically offset position from said travel arteries, said station structure having four distinct service areas, a first loop path defining in part a first station service path, said first loop path extendinG from one travel artery through said station structure past a first station service area to the other travel artery, a second loop path defining in part a second station service path, said second loop path extending from said other travel artery through said station structure past a second station service area opposite said first station service area to said one travel artery, a third station service path connected between said first loop path and said second loop path and extending through said station structure past a third station service area, and a fourth station service path connected between said second loop path and said first loop path and extending through said station structure past a fourth station service area opposite said third station service area, each of said service areas being located solely adjacent its respective service path and remote from the service paths of each of the other service areas.

2. The station arrangement as claimed in claim 1, wherein said station service area defines an unloading, a loading area, and/or a storage area along which each said station service path passes.

* * * * *